Aug. 10, 1943.   J. R. BOWMAN   2,326,614
AMPLIFIER
Filed Oct. 10, 1940
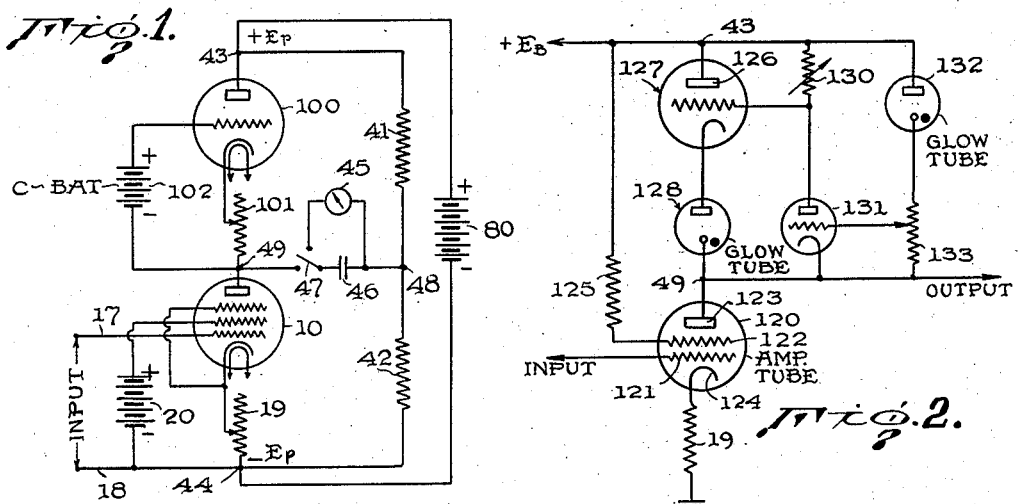
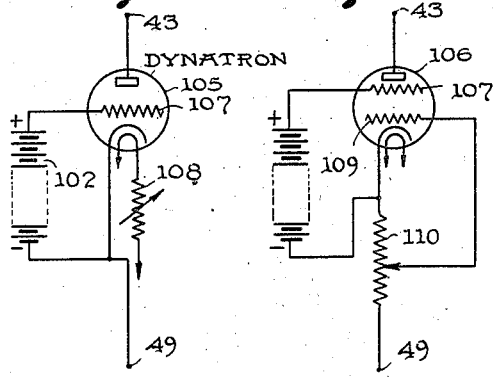
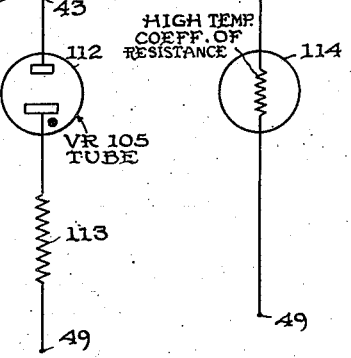
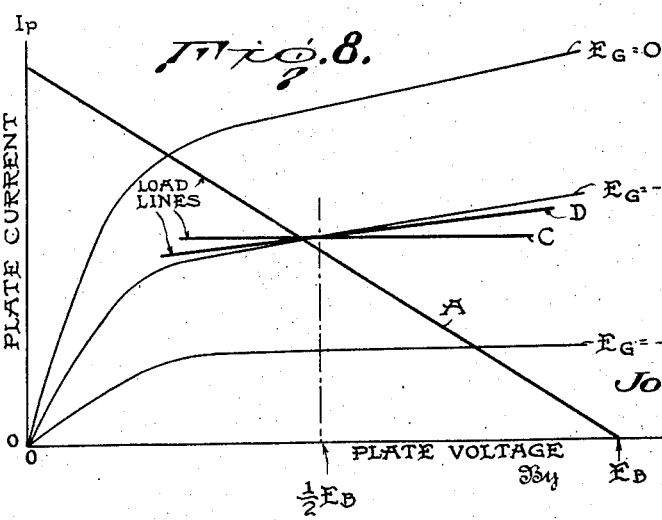
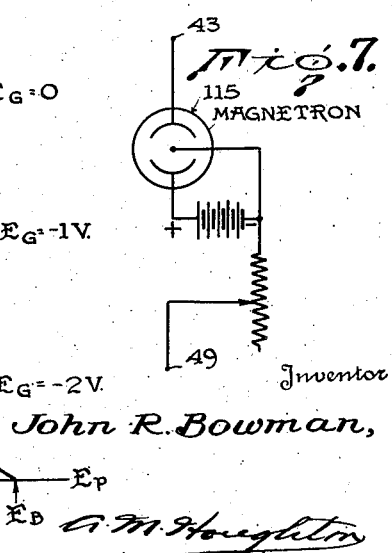
Inventor
John R. Bowman,
By G. M. Houghton
His Attorney Patented Aug. 10, 1943

2,326,614

UNITED STATES PATENT OFFICE 2,326,614

AMPLIFIER

John R. Bowman, Pittsburgh, Pa., assignor to Gulf Research & Development Company, Pittsburgh, Pa., a corporation of Delaware Application October 10, 1940, Serial No. 360,681

6 Claims. (Cl. 179—171)

This invention or discovery relates to amplifiers; and it comprises, in a vacuum tube voltmeter or other voltage amplifier, an amplifier circuit including a high amplification factor amplifying tube, a load impedance for the plate circuit of the tube adapted to afford low impedance independent of frequency to the no-signal component of the plate current of the tube and an infinite or negative impedance to the output signal component thereof; said circuit usually including in combination two equal resistances with the tube, impedance and resistances being connected as a bridge, means for applying a signal to be masured to the grid circuit of the tube and means for measuring potentials across the bridge; all as more fully hereinafter set forth and as claimed.

Voltmeters of the vacuum tube or thermionic type are useful in many relations, such as in thermocouple temperature measurement, pH measurement and other fields where it is desired to indicate accurately relatively feeble electromotive forces (voltages). A vacuum tube voltmeter is essentially an amplifier especially designed for non-fluctuating sensitivity and general stability and provided with suitable means for exhibiting the amplifier output voltage. The amplifier input is connected to the thermocouple or other instrument, the output potential of which is to be measured.

Amplification of high frequency alternating current signals is a relatively simple matter, but accurate amplification of low frequency signals, and above all direct current signals, is difficult. In particular it is difficult to secure at once a linear response (that is to say uniform increments of amplifier output voltage for equal increments of input voltage), and high sensitivity or high gain.

The amplification factor (mu) of a vacuum tube is the ratio of the change in plate voltage to a change (in the opposite direction) in control-electrode voltage, with a constant plate current. It represents the maximum theoretical voltage gain for the tube when employed as a voltage amplifier in conventional circuits. Several types of tubes are available having amplification factors of well over 1000, but in amplifying direct or low frequency alternating current usually only a small fraction of this value is realized as amplifier gain. Design of circuits of truly linear response having gains of over 50 is a matter of great difficulty.

A voltage amplifier circuit which would make effective the theoretical amplification factor of the tube would offer low impedance to the normal no-signal plate current, and infinite impedance to the output signal component. (The impedance of a circuit or a circuit element is defined as the quantity $\sqrt{L^2n^2+R^2}$ wherein L is the inductance, $n$ is a quantity equal to $2\pi$ times the frequency of the current flowing in the circuit and R is the resistance. Impedance tends to approach resistance as the inductance or the frequency, or both, are decreased, and is the quantity which plays a part in alternating current circuits analogous to that of resistance in direct current circuits.)

In the case of high frequency A. C. amplifiers, this condition of low impedance with respect to the no-signal plate current and infinite impedance with respect to the output signal component is approached by using an inductance for the load. A suitable inductance offers little resistance to the D. C. plate current of the tube, and high impedance to the A. C. component which is the amplified signal. Such an expedient is not possible in the case of D. C. or low frequency inputs, and even for high frequencies the response is not linear, but increases with the frequency.

Among the objects of the invention are the provision of a vacuum tube amplifier circuit capable of amplifying direct current or alternating current voltages, with a linear response, while achieving high gain; the provision of such an amplifier circuit in which the gain is independent of frequency, that is, is the same for a whole range of frequencies including zero frequency (direct current); the provision of such an amplifier in which the input circuit is of extremely high resistance, to facilitate voltage measurements in connection with glass-electrode pH measurement and the like; the provision of an amplifier circuit in which the main amplifier tube is loaded with the aid of an additional tube or tube serving as a current regulator in the plate circuit of the amplifier tube.

The invention is based on the discovery that amplifier tubes of certain types can be provided with an additional tube circuit or the equivalent acting as a current-regulating load resistor or load impedance in such a way as to achieve the condition outlined above, viz., to afford low impedance to the no-signal component, and high or negative impedance to the output signal component of the plate current.

The load impedance afforded by the load tube in such circuits does not follow Ohm's law ($E=IR$, wherein E is electromotive force, I is current and R is resistance); instead it offers little resistance to current at one value, and a very high resistance, positive or negative, to currents or current components other than that value.

Constant current regulators can be utilized as plate loads for the amplifier tube. A triode suitably connected gives good results. Certain simplified current regulators give good results in certain special fields of utilization.

In accordance with the invention, by employing for the load impedance a negative resistance circuit, having negative differential resistance at the normal plate current of the amplifier input tube, the amplifier gain can be increased very greatly, in fact not far short of the point of instability where such (negative) load resistance is made equal and opposite to the plate resistance of the amplifier tube. At such point the gain of the circuit is infinite.

The amplifier circuit of the present invention departs from conventional systems, inter alia in that in the working range the load line of the amplifier is of substantially zero or positive slope; that is to say the plate current is nearly constant, for changes in plate voltage, at least in the working range. In a modification of the invention embodying a triode as current regulator, the load line is practically a straight line of zero slope, and in another modification, utilizing a negative resistance current regulator device, the load line is a straight line of small positive slope. In all embodiments, upon application of a negative signal to the input grid of the amplifier, there is a very small change in plate current, and a large increase in plate voltage, and the theoretical gain of the tube is realized, or exceeded. In the case of the negative resistance loaded amplifiers the gain is practically unlimited. These considerations are described in detail below.

My amplifier achieves the objects above mentioned and realizes other advantages. It has a constant gain for potentials of any frequency, including continuous (zero frequency) by reason of the fact that the amplifier proper contains or need contain only purely resistive or thermionic circuit elements, without inductive or capacitative elements. The amplifier is very sensitive rendering it especially well suited for measurement of minute potentials, the gain is high, the response is accurately linear and the stability is excellent.

In the accompanying drawing I have shown diagrammatically seven examples of specific embodiments of apparatus within the purview of the invention. In the drawing, Fig. 1 is a diagram of one embodiment of the invention 1 making use of a triode in the current regulating circuit, Fig. 2 is a diagram of a modification utilizing triodes and glow tubes in the current regulating circuit, Figs. 3 to 7 are diagrams of other current regulating devices which are suitable for utilization in the circuit of Fig. 1 and Fig. 8 is a load line chart illustrative of the relations of plate current and plate voltage in the amplifier circuits of the invention.

Referring to the drawing and more especially Fig. 1, an amplifier tube 10 of the pentode type is provided, having a cathode of the heater type, a grid, a screen, a suppressor and a plate (anode). The tube can conveniently be an RCA 6J7G tube. Signals, which may be for example the E. M. F. developed by a thermocouple (not shown), are applied to the grid by a lead 17 and to the cathode by a lead 18 and an adjustable cathode self-bias resistor 19. A suitable potential is applied to the screen by a battery 20.

A triode 100 is employed as a current regulator. The triode has a very large resistor 101 in its cathode lead, for developing a large self-bias potential, proportional to the plate current. A C-battery 102 is provided, of such voltage and so connected as to buck out the cathode self-bias voltage nearly entirely, leaving only a small differential potential applied to the grid of the tube. With this arrangement any increase in plate current increases this differential voltage considerably, with consequent increase in tube resistance, thus tending to compensate for the change in plate current. The absolute values of the resistor and of the C-battery potential are not critical but their relationship needs careful adjustment. Such adjustment is readily made in practice, for a given circuit, and once made requires little further attention. In general it is desirable to have the C-battery voltage and the resistance both relatively high. Increasing the magnitudes of these quantities does not change the regulated current but stability of operation and gain are improved. In this form of the invention the voltage supplied by D-battery 80 needs to be rather high, to allow for the large voltage drop at resistor 101. The C battery 102, however, need have only very small cells because no current is drawn from it. For best results the power supply potential in the circuit of Fig. 1 should be quite uniform.

The amplifier of Fig. 1 is capable of very high gain, and linearity of response is good. It gives satisfactory results provided a reasonably constant potential power supply is available and provided the requirements for linearity of response are not too severe.

Fig. 2 shows a modification of the invention which presents special advantages as regards stability and linearity of response. An amplifying tube 120 is provided, with grids 121 and 122, a plate 123 and a cathode 124 having a cathode self bias resistor 19. The tube need not be of the extremely high-mu class but it should be of a type permitting a relatively large normal plate current and nearly linear plate characteristic functions in the working region. Certain small beam tetrode tubes are suitable. Since in the circuit the plate current is nearly constant a separate screen power supply is not required, and the main B supply, through a resistor 125 is used instead. A large triode 127 is provided having a glow tube 128 in its cathode lead to give fixed self bias. In parallel circuits with tubes 127 and 128 are a resistor 130 and tube 131, and a glow tube 132 and resistor 133. The load current, equal to the plate current of the amplifier tube, is split three ways among these three parallel circuits. The last two circuits carry only very small components of the total load current. The output is taken off at point 49 and a point equivalent to 48 in Fig. 1.

Tube 131 is advantageously a triode of the zero bias, low plate current, high-mu type. Its output is coupled directly to the grid of the tube 127 as shown.

Glow tube 132, which acts on very minute currents, is selected of such characteristics as to maintain an approximately constant potential difference across its terminals that is slightly less than the minimum potential difference across the load. Most of the variation of potential across the load thus appears across resistor 133. The variation is utilized to give positive bias to triode tube 131, which has 130 as a purely resistive load. The constant voltage across tube 128 should be equal to the recommended fixed bias for tube 127 plus the plate voltage across tube 131.

Glow tube 128 is of a different type from 132; it is a large one selected to give voltage regulator action for the range of plate current in tube 127.

The circuit achieves the results desired; it affords linear amplification over a very wide range, with a high amplification factor independent of the frequency of the current being amplified.

Considering the operation of the device; viewing the load circuit alone, let the potential of point 49 be fixed, and that of 43 be given a positive increment. The increment appears in full at the upper end of 133, and any proportional part of it may be applied to the grid of tube 131 by using that resistor as a voltage divider. Assuming that the whole amount is so applied, i. e., that the movable contact is at the top, a large negative increment appears in the potential of the plate of tube 131; this may be tenfold, or more, greater than that of 43, depending on the type of tube used. The large negative increment is applied to the grid of the large triode 127 and reduces its plate current in spite of the small positive increment in its plate voltage. Since nearly all the current of the load circuit flows as plate current in tube 127, the net effect of an increase in voltage across the load is a decrease in the current through it, i. e., a negative resistance condition has been established. Incidentally the cathode self-bias resistor 19 introduces a small amount of regeneration rather than the usual degeneration in this circuit, because the grid current increases with the application of a negative signal to the grid.

The adjustments in the circuit of Fig. 2 are critical. The regulation of the B supply should be good, as in this circuit fluctuations of the B-battery voltage affect the zero signal output as well as the gain. Similar considerations apply to the heater voltages, which require close stabilization. Resistors 133 and 130 should be carefully adjusted, to secure optimum results. Resistor 133 controls, principally, the negative resistance of the load element and 130 the current value at which that negative resistance is best exhibited; the two, therefore, should be adjusted to suit the plate resistance and current, respectively, of the amplifying tube 120. Gain is most conveniently controlled by resistor 133. When the gain is set to be equal to the theoretical amplification factor (mu) of the tube 120, the variational resistance of the circuit is infinite and the load acts as a constant current regulator; such a choice of constants makes the circuit a constant current regulator loaded amplifier, similar to Fig. 1.

Several other types of current regulating load means can be employed, some of which are shown in Figs. 3 to 7. The circuits and circuit elements shown in these figures are connected between points 43 and 49, in either of the circuits of Figs. 1 and 2. Amplifiers utilizing the load devices of Figs. 3 to 7 do not have all the advantages of those previously described, but are useful in certain special applications.

Figs. 3 and 4 show loading devices of the dynatron type, making use of a special dynatron tube (105 in Fig. 3, 106 in Fig. 4) having a grid 107 with large heat-dissipating ability. The grid next the plate is maintained by a C-battery 102, at a potential higher (more positive) than the plate. Because of the occurrence of secondary emission the plate resistance of the tube may be infinite or negative to small changes in plate current from a predetermined critical value. By setting the critical current of the tube equal to the no-signal plate current of amplifier input tube 10, the load requirements are fulfilled. In Fig. 3 the cathode emission is controlled by the heater input at 108 and in Fig. 4 by a self-biased inner grid 109, adjustment being made at 110. Adjustments are rather critical.

In Fig. 5 a cold cathode gas filled glow diode 112 is employed as the regulator tube. An RCA 874 or VR-105 tube is suitable. This type of tube exhibits negative resistance over a rather wide current range, which is below the usual voltage-regulation range of the tubes. A stabilizing resistor 113 is employed in series with the tube, having a value about equal to the negative resistance of the tube.

The conditions of operation of the glow tube in Fig. 5 are quite different from those of the tubes in Fig. 2. In the circuit of Fig. 5 the glow tube is operated in a very low current range such that it exhibits negative resistance. In the circuit of Fig. 2 both tubes are used in their "voltage regulator" range, which, for a given tube type, requires higher currents. Voltage regulator action is the more advantageous application of these types of tubes, and is usually far more stable than negative resistance action. In the former service, the tubes exhibit positive resistance approximately inversely proportional to the current, and therefore give a nearly constant potential drop across their terminals which is independent of the current through them as long as that current remains within rather sharply fixed limits. Thus they are in a sense equivalent to low resistance batteries of polarity to oppose the normal current flow of the circuit.

As shown in Fig. 6, a simple ballast resistor 114, in the form of an enclosed metal filament having a large temperature coefficient of resistance, can be employed as the current regulator. The wire is heated on passage of current therethrough and the resistance rises proportionally to temperature rise, so that some compensating action is obtained. This type of load gives excellent stability and linearity and is useful in applications where very high gain is not desired and where only direct or very low frequency currents are to be amplified.

In Fig. 7 a magnetron tube 115 is utilized as the current regulator. The characteristics of my amplifier circuits using this type of regulator are very similar to those of the systems described in connection with Figs. 3 and 4.

The regulating means of Figs. 2 to 7 in the amplifier circuits described can, by a suitable choice of circuit constants, be made to function as negative resistance loads, rather than as constant current loads, with production of extremely high gain, at some sacrifice of stability. Such modifications are useful in amplifiers which need to be extremely light and compact; e. g., miniature radios and aviation equipment.

Fig. 8 illustrates certain principles upon which the invention is based and is useful in understanding the operation of the several circuits. In the figure the dependence of the plate current $I_p$ on the plate voltage $E_p$ of a typical high-mu screen grid tube for three values of control grid bias, $E_g = 0$, $E_g = -1$ volt and $E_g = -2$ volt, is exhibited by the curves beginning at the origin.

Such curves are plate characteristic curves, usual in vacuum tube specifications. Four so-called load lines, lettered A to D are shown on the diagram. Generally, such a line expresses the relation of plate voltage to plate current for any particular circuit, and also gives the values of these quantities for any assigned grid bias by its intersection with the appropriate plate characteristic curve.

Line A is the load line of a conventional resistance loaded amplifier, that is, a tube with ohmic resistance only in the line to the positive B supply. Its equation is $E_B = E_p + RI_p$, where $E_B$ is the B supply voltage, $E_p$ is the plate voltage proper (that between the plate and the cathode of the tube), R the resistance.

Load line C drawn parallel to the $E_p$-axis represents a constant plate current. Such a line corresponds to the use of an ideal constant current regulator load, and very nearly represents the case for the circuit of Fig. 1. The comparison of this load line with that for the simple resistive load shows at once how much greater amplification is obtained in my circuits.

Finally, line D, of positive slope, represents the conditions for a negative resistance load. The diagram shows how the gain approaches infinity as the slope approaches that of the plate characteristic.

It is pointed out that the plate resistance of the amplifier tube, or the resistance of the plate circuit of the tube to the output signal, is merely the reciprocal of the slope of the plate characteristic at the working point, and the effective load resistance is the negative of the reciprocal of the slope of the load line at that point. It may also be noted that in here, as is usual in most classes of circuits, the transition from positive (ordinary) resistance to negative is through infinite value without change of sign; in mathematical language, as asymptote is crossed. It is usually only the conductance (reciprocal resistance) that can pass from positive to negative values through zero.

Comparing the several aspects of the invention: For a given negative signal applied to the grid (1) conventional resistance-coupled amplifiers show relatively large decrease in plate current, relatively small increase in plate voltage and small gain; (2) amplifiers such as in Fig. 1 with substantially constant current regulator loads show practically no change in plate current and a large increase in plate voltage, and they realize almost exactly the theoretical gain of the tube; (3) amplifiers with negative resistance loads show small increase in plate current, extremely large increase in plate voltage, and unlimited gain. The load resistances of the two modifications of the invention may be regarded as very positive or high, infinite, and negative, respectively; as compared with the load resistance of conventional resistance-coupled amplifiers which is low and positive.

The amplifier circuit of the present invention has been described primarily in connection with voltage measurement, but it is useful in many other relations, such as regulating, controlling and signalling, especially where stable amplification of direct or low frequency currents, with linear gain, is desired.

All the circuits can be operated on either battery (D. C.) power supply or on A. C. supply with provision of suitable rectifier and filter circuits.

The circuits shown contain only purely resistive and thermionic elements, and thus gain is independent of frequency. Furthermore, the input resistance of the circuits is very high. This feature is particularly advantageous in measuring the potential at pH-measurement glass electrodes; in electrometer measurements and other situations where the unknown source of E. M. F. has a high resistance. However, the amplifier can readily be adapted for use as a microammeter (low resistance input circuit) by provision of a shunt across the input, serving essentially as a grid leak. Such an arrangement permits the measurement of minute currents through relatively low resistance, and is useful for conducting tests of insulators and like uses.

Instead of the two equal series resistors 41 and 42, other expedients can be employed for establishing a reference potential at point 48, such as a battery connected at one end of the B-battery and opposing it, or a tap at the middle of the B-battery. For strictly alternating current applications such reference potential is unnecessary; either side of the B-battery power supply can be employed as a return for the output, with provision of a blocking condenser in series with one or both of the output leads, as in resistance-coupled amplifiers.

The simple system described gives excellent results. In a typical practical embodiment employing for the galvanometer or ordinary meter-type galvanometer of resistance about 30 ohms and giving a full-scale deflection for 1 milliampere applied current, and a 16 mfd. paper condenser at 46, the apparatus gives a linear, reproducible response up to several millivolts. The voltage amplification is large; of the order of 1500 with a 6J7G tube acting as amplifier proper. As the usually available output current is low, the ballistic measuring arrangement described is usually more convenient than the provision of a sensitive high-resistance voltmeter, but if desired such a voltmeter can be used for continuous indication by connecting it across points 48 and 49 in lieu of the galvanometer-condenser-switch assemblage.

What I claim is:

1. In an amplifier circuit of the type described, an amplifying tube, a plate circuit for the tube including a load impedance adapted to afford low impedance to the no-signal plate current of the tube and uniform negative impedance to the output signal component of the plate current of the tube, means for applying a signal potential to be amplified to the amplifying tube and means for taking off an amplified signal potential therefrom.

2. In an amplifier circuit of the type described, an amplifying tube having a plate circuit, and loading means in said circuit for regulating the plate current therein, comprising a load impedance of such character as to keep the slope of the plate-current-plate voltage load line for the tube, always zero or positive.

3. In an amplifier circuit a pentode amplifying tube, a cathode self-bias resistor for said tube, a loading tube, a cathode self-bias resistor for said loading tube, a supply of plate potential, said tubes, resistors and supply being connected in series; means for applying a signal to the amplifying tube and means for taking off amplified signal voltage from a point between the anode of the amplifying tube and the resistor for the loading tube and a point in circuit maintained at a potential which is a constant fraction of the supply of plate potential; said cathode resistor for the loading tube being of such resistance as to develop a large self-bias potential proportional to the plate current; and a C-battery in series with a grid of said loading tube, of such polarity and having sufficiently high voltage, in relation to said loading tube cathode resistor, to buck out the cathode self-bias voltage nearly completely, leaving only a small differential negative potential applied to the grid of the loading tube.

4. The apparatus of claim 3 wherein the means for taking off amplified signal voltage comprises a condenser; a ballistic galvanometer, and means for alternately connecting the condenser to said two points for charging thereof, and connecting the condenser to the ballistic galvanometer for discharge thereto.

5. In an amplifier circuit of the type described, an amplifying tube having a plate circuit, and loading means in said circuit for regulating the plate current therein, comprising a load impedance including an adjustable circuit element of such character as to cause the amplifier circuit to function as a voltage amplifier along a load line of definite slope, said slope being adjustable to any arbitrarily small value by adjustment of said circuit constants without change of circuit pattern.

6. In an amplifier circuit for exhibiting output voltage with substantially non-fluctuating sensitivity, a high amplification factor amplifying tube, a load impedance for the plate circuit of said tube of such character as to afford low impedance to the no-signal component of the plate current and infinite or negative impedance to the output signal component thereof, means for establishing a reference potential connected with said tube and load impedance as a bridge, means for applying a signal to be measured to the grid circuit of said tube, and means for measuring potentials across the bridge.

JOHN R. BOWMAN.

CERTIFICATE OF CORRECTION.

Patent No. 2,326,614.                      August 10, 1943.

JOHN R. BOWMAN.

It is hereby certified that error appears in the printed specification of the above numbered patent requiring correction as follows: Page 1, first column, line 14, for "masured" read --measured--; page 2, second column, line 26, for "D-battery" read --B-battery--; page 4, first column, line 16, strike out the period and insert the following -

> --of the load, and $I_p$ the plate current. The equation expresses the fact, with the aid of Ohm's law, that the "B" voltage is equal to the sum of the plate voltage and the voltage drop across the load resistor.
>
> Similar considerations apply to more general loads, although then $E_B$ loses its simple significance, and R may not be a constant. The concept of a load line however is applicable to all vacuum tube amplifiers.--;

and that the said Letters Patent should be read with this correction therein that the same may conform to the record of the case in the Patent Office.

Signed and sealed this 5th day of October, A. D. 1943.

(Seal)                                          Henry Van Arsdale,
                                             Acting Commissioner of Patents.